United States Patent
Karandikar et al.

(10) Patent No.: US 10,182,354 B2
(45) Date of Patent: Jan. 15, 2019

(54) METHODS AND SYSTEMS FOR PROVIDING STANDALONE LTE BASED COMMUNICATION NETWORKS

(71) Applicant: Indian Institute of Technology Bombay, Mumbai (IN)

(72) Inventors: Abhay Karandikar, Mumbai (IN); Pranav Kumar Jha, Gurgaon (IN); Karunakaran Kumar, Hyderabad (IN); Pon Nidhya Elango, Chennai (IN); Pravin P Magar, Aurangabad (IN); Shahid A Nadaf, Goa (IN); Meenakshi Tripathi, Bhopal (IN); Akshatha Nayak M, Bangalore (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/636,033

(22) Filed: Jun. 28, 2017

(65) Prior Publication Data
US 2017/0303139 A1    Oct. 19, 2017

(30) Foreign Application Priority Data
May 17, 2017    (IN) .............................. 201721017349

(51) Int. Cl.
| | | |
|---|---|---|
| *H04W 40/00* | (2009.01) | |
| *H04W 16/18* | (2009.01) | |
| *H04L 29/06* | (2006.01) | |
| *H04W 16/02* | (2009.01) | |
| *H04W 24/02* | (2009.01) | |
| *H04W 40/12* | (2009.01) | |
| *H04W 74/08* | (2009.01) | |
| *H04W 88/02* | (2009.01) | |
| *H04W 84/04* | (2009.01) | |
| *H04W 76/27* | (2018.01) | |
| *H04W 84/10* | (2009.01) | |

(52) U.S. Cl.
CPC ......... *H04W 16/18* (2013.01); *H04L 65/1016* (2013.01); *H04L 65/1063* (2013.01); *H04L 65/80* (2013.01); *H04L 69/08* (2013.01); *H04W 16/02* (2013.01); *H04W 24/02* (2013.01); *H04W 40/12* (2013.01); *H04W 74/0833* (2013.01); *H04W 76/27* (2018.02); *H04W 84/042* (2013.01); *H04W 84/10* (2013.01); *H04W 88/02* (2013.01)

(58) Field of Classification Search
CPC .... H04W 16/18; H04W 76/27; H04L 65/1016
USPC ...................... 455/446, 422.1, 450, 418, 445
See application file for complete search history.

(56) References Cited

U.S. PATENT DOCUMENTS

| | | | | |
|---|---|---|---|---|
| 2014/0302850 A1* | 10/2014 | Young | .................. | H04W 88/04 455/436 |
| 2014/0372614 A1* | 12/2014 | Tan | ........................ | H04L 47/805 709/226 |
| 2016/0344635 A1* | 11/2016 | Lee | .......................... | H04L 47/22 |

* cited by examiner

Primary Examiner — Nghi H Ly
(74) Attorney, Agent, or Firm — Mannava & Kang, P.C.; Vinay Malik

(57) ABSTRACT

Standalone LTE based communication networks. Embodiments herein disclose methods and systems for providing LTE based communication to at least one User Equipment (UE) over a small region using a rapidly deployable standalone network wherein at least one LTE UE would be able to connect to an Application Server (AS).

19 Claims, 6 Drawing Sheets

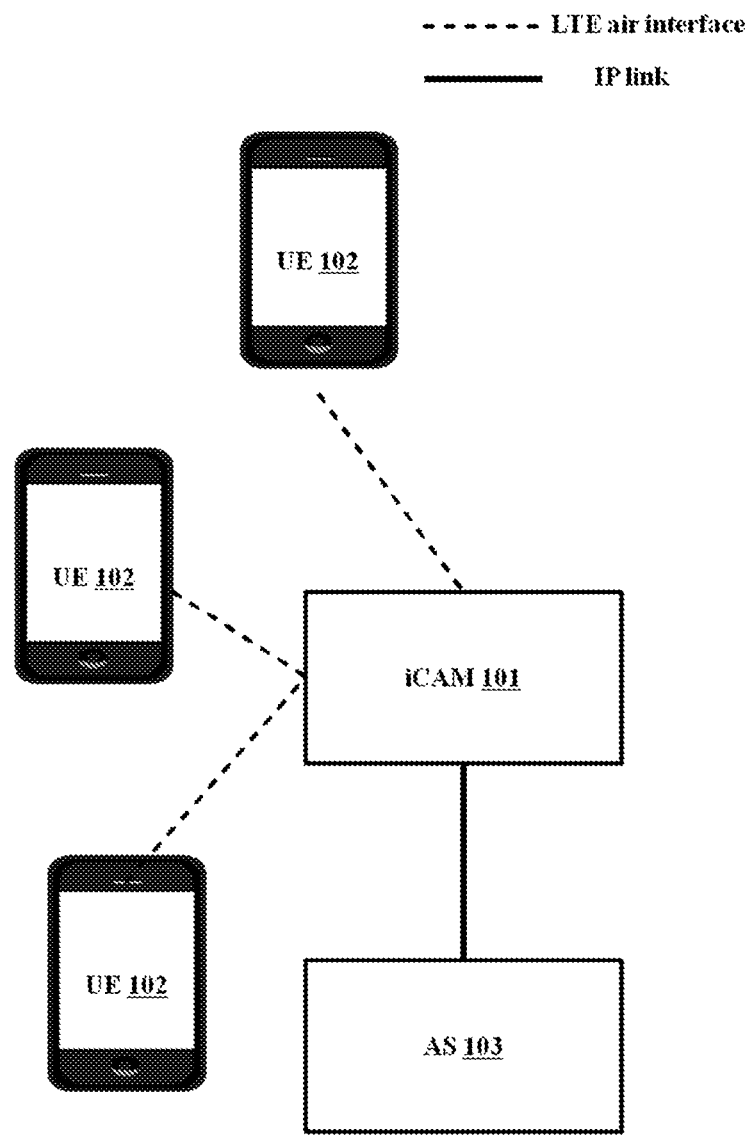

METHODS AND SYSTEMS FOR PROVIDING STANDALONE LTE BASED COMMUNICATION NETWORKS

CROSS REFERENCE TO RELATED APPLICATIONS

This application claims priority from, IN Application Number 201721017349, filed on May 17, 2017, the disclosure of which is incorporated by reference herein.

TECHNICAL FIELD

Embodiments herein relate to Long Term Evolution (LTE) communication networks, and more particularly to providing rapidly deployable LTE communication networks over a small region.

BACKGROUND

Broadly, a Long Term Evolution (LTE) communication network comprises of a network of base stations (called Evolved Universal Terrestrial Radio Access Network or, E-UTRAN), and a core network (called Evolved Packet Core, or EPC). The EPC is in turn composed of several logical entities, and as a whole provides connectivity between the E-UTRAN and the public Internet. However, in case of scenarios where the network needs to be rapidly deployed, it may be difficult to implement the standard LTE communication network.

In an example scenario, for the purpose of certain types of public safety applications, which might need rapidly deployable systems, such a large and complex system might be unnecessary and may act as an impediment for rapid deployment, which is critical to support emergency communications. Further, such networks do not require connectivity to public networks. Several applications of public safety networks require to be cut-off from the public Internet, or are required to be deployed in remote regions which do not have an existing infrastructure, while providing connectivity only among the users of the service, typically over a local region only (for example, dealing with a hostage situation in a multistoried building, hostage situation or any other emergency in dense forest area, and so on).

OBJECTS

The principal object of embodiments herein is to disclose providing of Long Term Evolution (LTE) based communication to at least one User Equipment (UE) over a small region, without the need for external infrastructure wherein the LTE communication network is rapidly deployable.

Another object of the embodiments herein is to disclose an architecture for LTE based communication network, wherein the architecture is based on Software Defined Networking (SDN).

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIG. 1 depicts a LTE communication system comprising of at least one UE connected to an AS through an iCAM module, according to embodiments as disclosed herein;

DETAILED DESCRIPTION

Figure 2A:
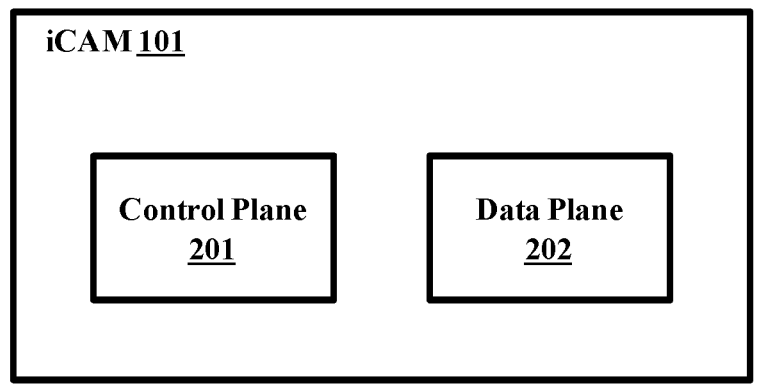
FIGS. 2a, 2b and 2c depict the iCAM module, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for providing LTE based communication to at least one User Equipment (UE) over a small region using a rapidly deployable standalone network wherein at least one LTE UE would be able to connect to an Application Server (AS). Referring now to the drawings, and more particularly to FIGS. 1 through 4, where similar reference characters denote corresponding features consistently throughout the figures, there are shown preferred embodiments.

Embodiments herein disclose an apparatus, which integrates the functionality of LTE nodes such as eNodeB, MME, SGW and PGW, HSS, PCRF in a single box and primarily manages the communication between the UEs and the AS. Embodiments herein also disclose methods to optimize control plane and data plane processing in this apparatus further to integration of multiple nodes, to reduce the complexity of a typical LTE network and bring down the network latency.

FIG. 1 depicts a LTE communication system comprising of at least one UE connected to an AS through an integrated Core and Access Module (iCAM) module. The iCAM module 101 is an apparatus that can be connected to at least one UE 102 using traditional LTE over-the-air interface as standardized by the Third Generation Partnership Project (3GPP). The iCAM module 101 can enable traditional/commercial UEs 102 to communicate, without any changes in them. The UE 102 can be any device configured to communicate using a LTE communication network. Examples of the UE 102 can be, but not limited to, mobile phones, smart phones, tablets, laptops, computers, dongles, Internet of Things (IoT) devices, wearable computing devices, vehicle infotainment systems, navigation systems, security systems, and so on. The iCAM module 101 can be connected to AS 103 using an Internet Protocol (IP) based link. In an embodiment herein, the iCAM module 101 can be connected to the AS 103 using an SGi interface similar to how the standard LTE Core Network, specifically LTE PGW, is connected to the AS 103.

Figure 2B:
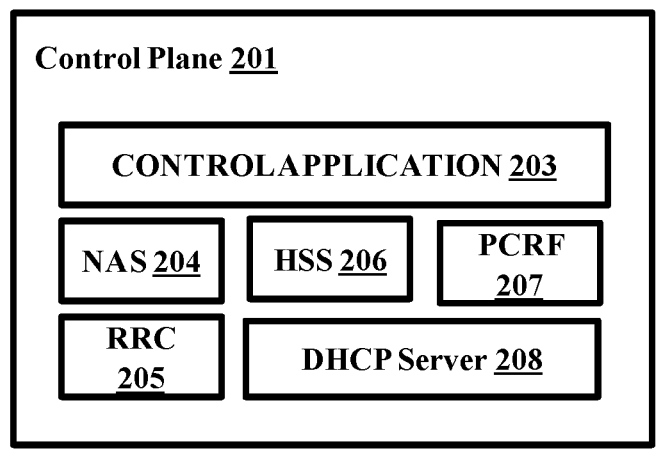
Figure 2C:
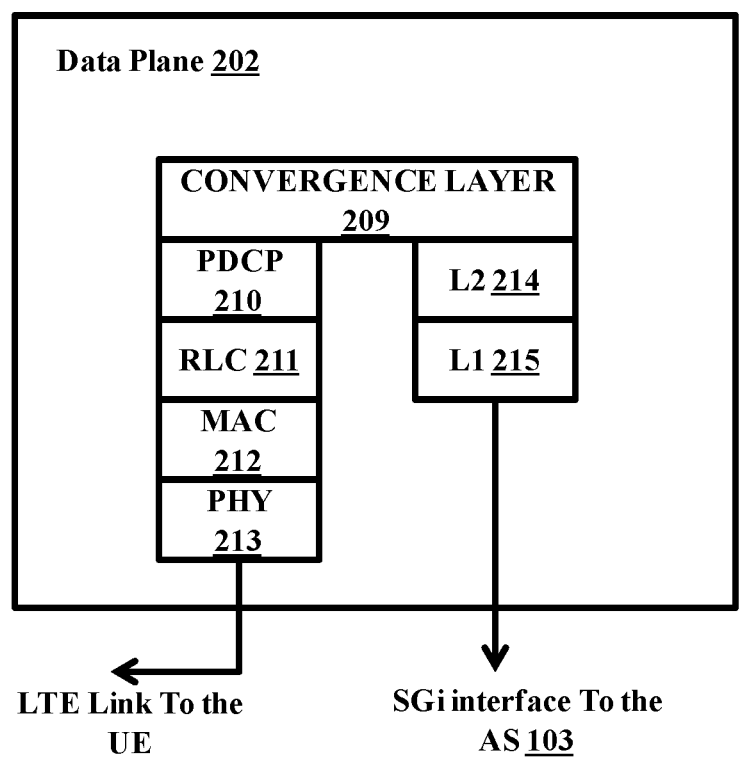

FIGS. 2a, 2b and 2c depict the iCAM module. The iCAM module 101 performs the same responsibilities as the traditional LTE eNB and Core Network (CN) nodes in terms of the communication with the UE.

The iCAM module 101 as depicted comprises of a control plane 201 and a data plane 202. The control plane 201 can be a generic control plane entity. The control plane 201 performs the control plane functions of the LTE based network in order to support the wireless connectivity of the UE 102 to the network. The data plane 202 can be a generic data plane entity. The data plane 202 performs the data forwarding between the UEs 102 and AS 103. The separation of the control plane 201 and the data plane 202 can be based on the paradigm of SDN.

As depicted in FIG. 2b, the control plane 201 comprises of a control application 203, a Non-Access Stratum (NAS) layer 204, a Radio Resource Control (RRC) layer 205, a Home subscriber Server (HSS) layer 206, a Policy and Charging Rules Function (PCRF) layer 207, and a Dynamic Host Configuration Protocol (DHCP) server 208. The HSS layer 206 and the PCRF layer 207 enable authentication of the UEs 102 and provide QoS related information to other layers to aid in enforcing the required QoS. The RRC layer 208 performs the functions as in a traditional LTE eNodeB (eNB). The NAS layer 204 performs the functions as in a traditional LTE MME. The DHCP server 208 helps in the allocation of IP addresses to UEs during the Attach procedure.

The iCAM module 101 enables optimization of the control (signaling) plane processing with the help of a control plane architecture, wherein the control plane functions of the LTE eNodeB, LTE MME, LTE SGW and LTE PGW have been merged into a single node. The merger of the control plane functionality has resulted in the removal of the following control (signaling) plane layers: S1 Application Protocol (S1AP), X2 Application Protocol (X2AP), Stream Control Transmission Protocol (SCTP) and General Packet Radio Service (GPRS) Tunneling Protocol (GTP) layer for the Control Plane (GTP-C), hereby reducing the control plane processing.

As depicted in FIG. 2c, the data plane 202 comprises of the LTE eNodeB radio protocol stack for the radio interface towards UEs, a Convergence Layer and, Layer 2 214 and Layer 1 215 of the IP infrastructure for the SGi interface towards the AS 103. The LTE radio interface stack in the data plane 202 further comprises of a Packet Data Convergence Protocol (PDCP) layer 210, a Radio Link Control (RLC) layer 211, a Media Access Control (MAC) layer 212, a Physical (PHY) layer 213. The PHY layer 213, the MAC layer 212, the RLC layer 211, and the PDCP layer 210, perform the functions as in a traditional LTE eNodeB (eNB). The convergence layer 209 serves as the interface between the LTE radio protocol stack and the IP infrastructure on the interface towards the AS 103. Layer 2 214 and Layer 1 215 could be the MAC and PHY layers corresponding to a LAN technology such as the Ethernet.

The convergence layer 209 interfaces with the LTE radio protocol stack and sends the IP packets received from UEs via the radio protocol stack directly to the AS 103 over the SGi interface. The convergence layer 209 can also ensure QoS requirements, which are enforced by the PCRF 207. Thus, the iCAM module 101 employs a single convergence layer and enables optimization of data processing function by eliminating the flow of data through multiple protocol towers consisting of the following layers (GTP-U/IP/L2/L1 layers) in the eNodeB, S-GW and P-GW which typically happens in the traditional LTE network.

Figure 3A:
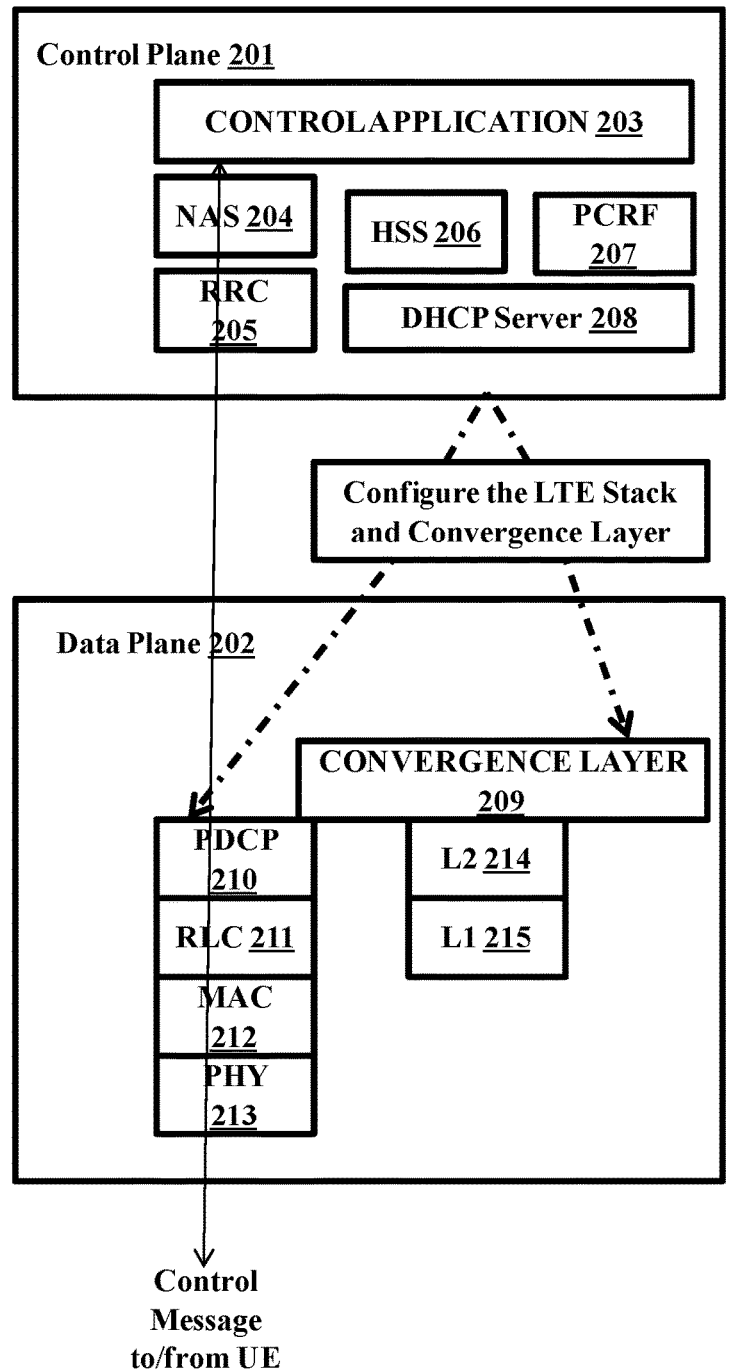
FIGS. 3a and 3b depict the signaling flow path and data flow path between the AS and the UE respectively, according to embodiments as disclosed herein.

As depicted in FIG. 3a, the LTE radio protocol stack in the data plane is transparent to control messages from/to the UE. Uplink control messages are forwarded to the control plane for further processing while downlink control messages from the control plane are forwarded as-is by the data plane to the UE. The control application 203 configures the radio protocol stack layers based on the inputs from the PCRF 207. The QoS parameters provided by the PCRF 207 are mapped appropriately by the control application 203, to the configurable parameters of the PDCP, RLC and MAC layers of the LTE radio protocol stack in the data plane. The control application 203 also controls the convergence layer 209 by providing information for adding/modifying entries of its routing map between the LTE Evolved Packet System (EPS) bearer identifiers and traffic flow templates, based on the inputs from the PCRF 207.

Figure 3B:
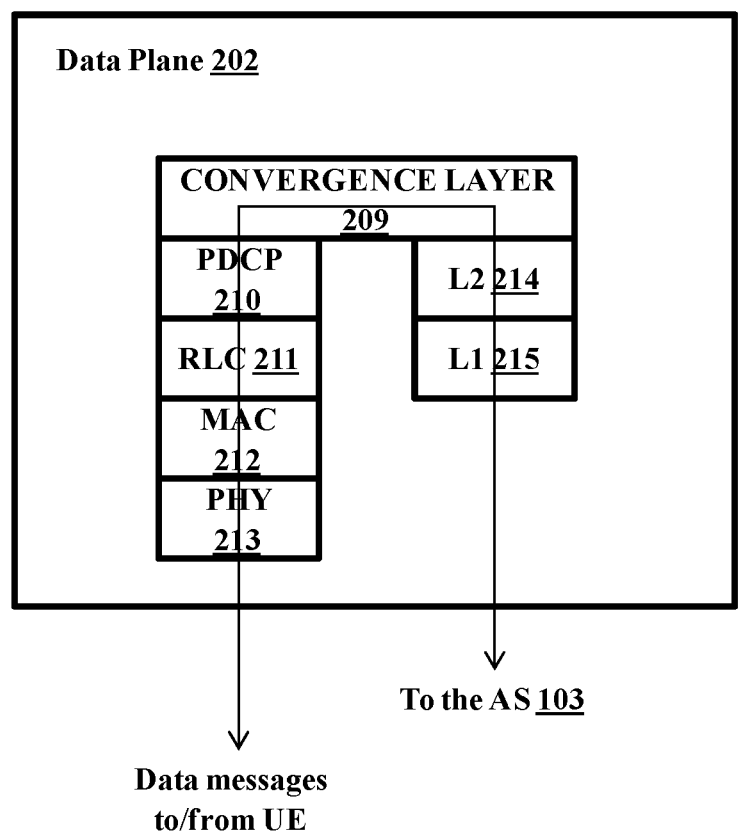

The convergence layer 209 behaves like a router, forwarding IP packets from different UEs to the AS and vice versa. As depicted in FIG. 3b, the convergence layer 209 receives IP packets from the AS 103 over the SGi interface and forwards the packets over the LTE radio interface to the UEs and vice versa for uplink data flows.

The IP packets sent over the LTE radio interface between a UE and the iCAM can be part of different bearers. The convergence layer 209 can maintain a one-to-one routing map between the LTE EPS bearer identifiers and traffic flow templates (for example, TCP/IP identifiers such as IP address and TCP port number) for different UEs. An example map is depicted in table 1. The convergence layer 209 can consult one such routing map for routing the IP packets to and from the UE 102. The convergence layer 209 can thus ensure the QoS requirements enforced by the PCRF, based on the information provided by the control application 203.

TABLE 1

| IP address | Port number | EPS Bearer ID | QoS |
| --- | --- | --- | --- |

Figure 4:
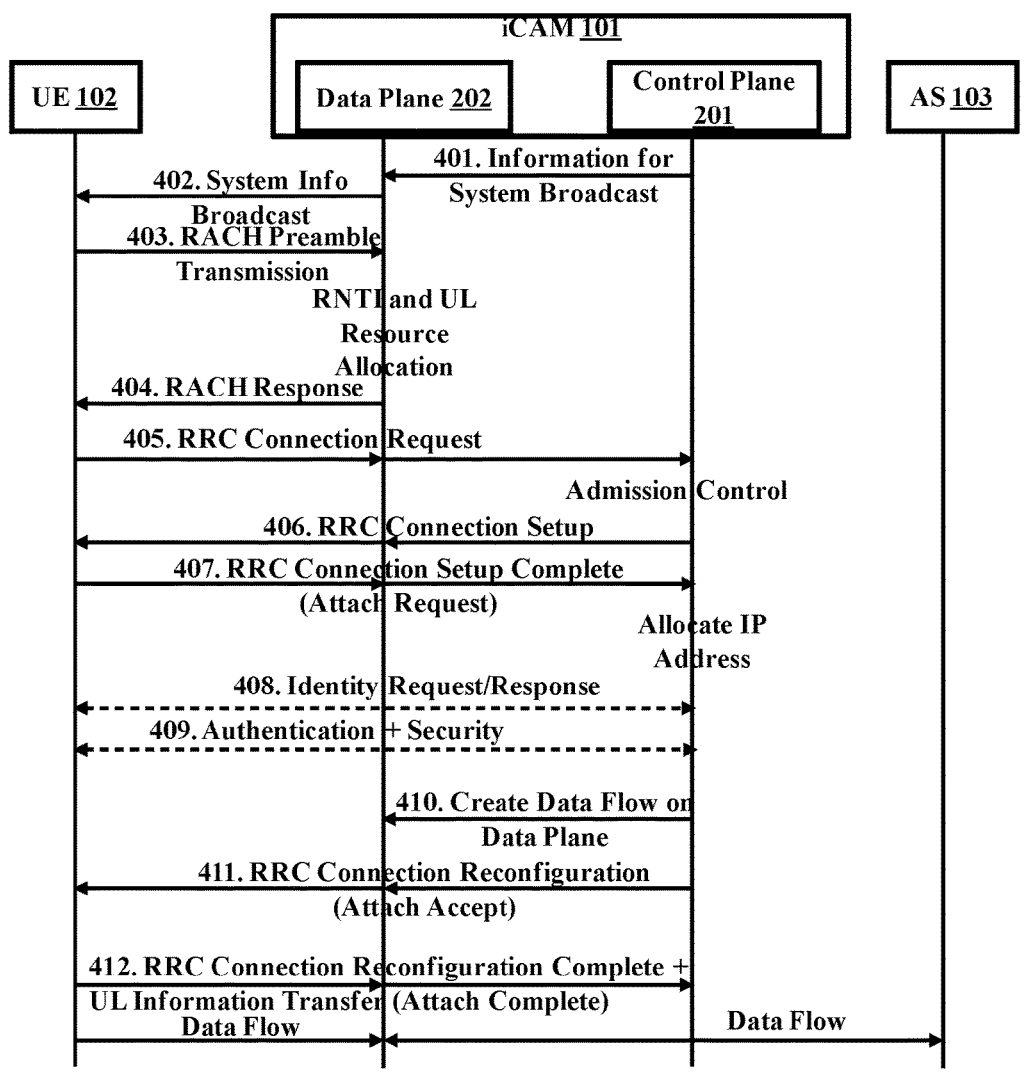
FIG. 4 is a flowchart depicting the call flow path for LTE attach, according to embodiments as disclosed herein.

FIG. 4 is a flowchart depicting the call flow path for LTE attach. The signaling messages between the UE and the LTE network remain unchanged allowing the usage of existing LTE UEs. In step 401, the control plane 201 sends the details of the System Information Broadcast message (MIB and SIB), synchronization signals, reference signals, and so on to the data plane 202. In step 402, the MIB and SIB messages along with the reference and synchronization signals are broadcasted by the data plane 202 in the cell administered by it. The MIB and SIB messages contain cell access and other related parameters. When the UE 102 powers on, it synchronizes with the network (a cell in its vicinity) with the help of the above-mentioned broadcast signals and messages (downlink). In step 403, the UE 102 sends a RACH (Random Access Channel) request using a signature sequence called a RACH Preamble, for uplink synchronization and to attach to the network. On receiving the RACH Preamble, the data plane 202 allocates a temporary identity to the UE 103, which is made permanent after completion of the successful RACH procedure. The permanent identity is hereinafter referred to as CRNTI (Cell Radio Network Temporary Identifier). The data plane 202 also allocates uplink resources for the UE 102. In step 404, on successful RACH attempt, the data plane 202 sends the RACH response message to the UE 102. The temporary identity along with uplink resources is sent to the UE 102 as part of RACH Response (to enable further communication between the UE 102 and the network). In step 405, the UE 102 sends out an RRC (Radio Resource Control) connection request to the data plane 202. The data plane 202 is transparent to this message and forwards it to the control plane 201. As part of the handling of the RRC connection setup procedure, the control plane 201 may initiate an admission control function also and admit a UE only if there are enough resources available to handle the UE. In step 406, the control plane 201 transmits the RRC connection setup message to the UE via the data plane 202 in response to the RRC Connection request. This contains the configuration details of dedicated signaling radio bearer (used for further communication between the UE 102 and the iCAM 101). In step 407, once the UE 102 has received the RRC connection setup message, it sends out the RRC connection setup complete message, which contains the Attach Request. In step 408, the UE 102 sends the UE identity response message containing the IMSI (International Mobile Subscriber Identity), in response to the identity request sent by the control plane 201. In step 409, the UE 102 transmits its configuration as a message to the control plane 201, which is then authenticated by the control plane 201 by sending it to the HSS layer 206. This message is transmitted only in the absence of UE context in the network, if the Attach Request was not integrity protected or in case of the failure of integrity check. The control plane 201 in conjunction with the HSS 206 does this. The control plane 201 then allocates IP address for the UE 102 with the help of DHCP (Dynamic Host Configuration Protocol). In step 410, the control plane 201 configures the data flow paths at the data plane. In step 411, on completion of the data flow path configuration, the control plane 201 sends out the RRC connection reconfiguration message (along with the Attach Accept message) to the UE 102. This message contains the EPS bearer identity and the Attach Accept message containing the DHCP allocated IP address for the UE 102, as specified in step 411. In step 412, the UE 102 replies back to the control plane 201 with the RRC connection reconfiguration complete and Attach Complete messages. Once the UE 102 obtains an IP Address, the UE 102 can send uplink packets towards the data plane, which then uses the pre-configured data flow path for transferring the data towards the AS 103.

Embodiments herein disclose a simpler architecture of an LTE communication network, with applications to public safety/emergency communication. Embodiments herein can be rapidly deployed, which is critical to support emergency communications. Embodiments herein can enable LTE networks to be deployed in remote regions which do not have an existing infrastructure, while providing connectivity only among the users of the service, typically over a local region only (for example, a hostage situation). Embodiments herein can be based on the SDN paradigm of separate control and data planes in a network. Embodiments herein can enable more efficient control as well as data plane processing than the standard LTE architecture due to merging of functionality of the LTE Access & Core network in a single node and reduction of multiple protocol layers. Embodiments herein provide a guaranteed Quality of Service (QoS) connectivity between the UEs and an Application Server (AS).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An apparatus (101) in a Long-Term Evolution (LTE) communication network, the LTE network being a stand-alone network with reduced complexity, comprising the apparatus (101) connected to at least one User Equipment (UE) (102) using an LTE over-the-air interface and to an Application Server (AS) (103) using an SGi interface, wherein the apparatus comprises:
    control plane and data plane entities (201, 202) configured to integrate the functionality of an eNodeB and functionality of Core Network elements without any changes in the interface towards the UE, wherein the control plane and the data plane are separated based on the paradigm of Software Defined Networking (SDN);
    the control plane entity configured to perform the signaling functions of eNodeB, Mobility Management Entity (MME), Serving Gateway (S-GW) and Packet Data Network Gateway (PDN GW/P-GW), and does not comprise of S1 Application Protocol (S1AP), X2 Application Protocol (X2AP), Stream Control Transmission Protocol (SCTP) and General Packet Radio Service (GPRS) Tunneling Protocol (GTP) for Control Plane (GTP-C) layers; and
    the data plane entity configured to perform data forwarding functionality of eNodeB, S-GW and P-GW and does not comprise of General Packet Radio Service (GPRS) Tunneling Protocol (GTP) for User Plane (GTP-U) layer.

2. The apparatus, as claimed in claim 1, wherein the control plane entity(201) comprises of a control application (203), a Non-Access Stratum (NAS) layer (204), a Radio Resource Control (RRC) layer (205), a Home subscriber server (HSS) layer (206), a Policy and Charging Rules function (PCRF) layer (207), and a Dynamic Host Configuration Protocol (DHCP) server (208).

3. The apparatus as claimed in claim 2, wherein the control application can configure the radio protocol stack layers in the data plane entity.

4. The apparatus as claimed in claim 2, wherein the control application can control the routing map of the convergence layer in the data plane entity, according to the QoS requirements provided by the PCRF layer.

5. The apparatus, as claimed in claim 1, wherein the data plane entity (202) comprises of a radio protocol stack for a radio interface towards the UE (102), a Convergence Layer (209) and a Layer 2 (214) and a Layer 1 (215) of IP infrastructure for an SGi interface towards the AS (103).

6. The apparatus, as claimed in claim 5, wherein the radio interface stack in the data plane entity (202) further comprises a Packet Data Convergence Protocol (PDCP) layer (210), a Radio Link Control (RLC) layer (211), a Media Access Control (MAC) layer (212), and a Physical (PHY) layer (213).

7. The apparatus, as claimed in claim 5, wherein the convergence layer (209) is configured to integrate the radio protocol stack towards the air interface and the IP stack towards SGi interface and route IP packets between the UE (102) and the AS (103), wherein the convergence layer (209) is configured to send packets received from the UE (102) via the radio protocol stack to the AS (103) over the SGi interface.

8. The apparatus, as claimed in claim 5, wherein the convergence layer (209) is configured to route IP packets between the AS (103) and the UE (102), wherein the convergence layer (209) is configured to send packets received from the AS (103) over the SGi interface to the UE (102) via the radio protocol stack.

9. The apparatus, as claimed in claim 5, wherein the convergence layer (209) is configured to maintain a one-to-one routing map between LTE EPS bearer identifiers and traffic flow templates for at least one UE (102), to route IP packets between the UE (102) and the apparatus (101) over various bearers and ensure QoS requirements enforced by the PCRF layer (207).

10. The apparatus as claimed in claim 5, wherein the data plane entity is further configured to forward the uplink control messages flowing from the UE to the apparatus, to the control plane entity for further processing, wherein the radio protocol stack in the data plane entity is transparent to the uplink control messages.

11. The apparatus as claimed in claim 5, wherein the data plane entity is further configured to forward the downlink control messages sent by the control plane entity in the apparatus to the UE, wherein the radio protocol stack in the data plane entity is transparent to the downlink control messages.

12. A method for providing Long Term Evolution (LTE) based communication using a standalone LTE network with reduced complexity, the network comprising an integrated Core and Access Module (iCAM) module (101) connected to at least one User Equipment (UE) (102) using an LTE over-the-air interface and to an Application Server (AS) (103) using an SGi interface, the method comprising:
   integrating, by a control plane and data plane entities (201, 202) the functionality of an eNodeB and functionality of Core Network elements without any changes in the interface towards the UE, wherein the control plane and the data plane are separated based on the paradigm of Software Defined Networking (SDN);
   performing signaling functions of eNodeB, Mobility Management Entity (MME), Serving Gateway (S-GW) and Packet Data Network Gateway (PDN GW/P-GW) by the control plane entity, wherein the control plane entity does not comprise of S1 Application Protocol (S1AP), X2 Application Protocol (X2AP), Stream Control Transmission Protocol (SCTP) and General Packet Radio Service (GPRS) Tunneling Protocol (GTP) for Control Plane (GTP-C) layers; and
   performing, data forwarding functionality of eNodeB, S-GW and P-GW by the data plane entity, wherein the data plane entity does not comprise of General Packet Radio Service (GPRS) Tunneling Protocol (GTP) for User Plane (GTP-U) layer.

13. The method, as claimed in claim 12, wherein the IP packets are directly routed between the UE (102) and the AS (103), by a convergence layer (209) in the data plane entity.

14. The method, as claimed in claim 12, wherein the radio protocol stack towards the air interface and the IP stack towards SGi interface are interfaced by the convergence layer (209) in the data plane entity.

15. The method, as claimed in claim 12, wherein the method further comprises of configuring the radio protocol stack layers in the data plane entity by a control application (203) in the control plane entity.

16. The method, as claimed in claim 12, wherein the method further comprises of configuring the convergence layer (209) by controlling its routing map between LTE Evolved Packet System (EPS) bearer identifiers and traffic flow templates, by the control application in the control plane entity based on QoS requirements from a Policy and Charging Rules Function (PCRF) layer (207).

17. The method, as claimed in claim 12, wherein the uplink control messages sent by the UE are received by the data plane entity in the apparatus and forwarded to the control plane entity for further processing.

18. The method as claimed in claim 12, wherein the downlink control messages sent by the control plane entity in the apparatus are forwarded to the UE by the data plane entity, wherein the radio protocol stack in the data plane entity is transparent to the downlink control messages.

19. The method, as claimed in claim 12, wherein a one-to-one routing map between LTE EPS bearer identifiers and traffic flow templates for at least one UE (102) is maintained by a convergence layer in the data plane entity (202), to route IP packets between the UE (102) and the apparatus (101) over various bearers and ensure QoS requirements enforced by the PCRF layer (207).

* * * * *